(12) United States Patent
Gorenz et al.

(10) Patent No.: US 11,867,282 B1
(45) Date of Patent: Jan. 9, 2024

(54) PLANETARY GEAR BOX

(71) Applicant: Rolls-Royce Deutschland Ltd & Co KG, Blankenfelde-Mahlow (DE)

(72) Inventors: Paul Gorenz, Berlin (DE); Maximilian Prölss, Berlin (DE)

(73) Assignee: ROLLS-ROYCE DEUTSCHLAND LTD & CO. KG, Blankenfelde-Mahlow (DE)

( * ) Notice: Subject to any disclaimer, the term of this patent is extended or adjusted under 35 U.S.C. 154(b) by 0 days.

(21) Appl. No.: 17/890,692

(22) Filed: Aug. 18, 2022

(30) Foreign Application Priority Data

Aug. 27, 2021 (DE) .................. 10 2021 122 300.8

(51) Int. Cl.
*F01D 15/12* (2006.01)
*F16H 57/04* (2010.01)
(Continued)

(52) U.S. Cl.
CPC ......... *F16H 57/0471* (2013.01); *F01D 15/12* (2013.01); *F16C 17/02* (2013.01);
(Continued)

(58) Field of Classification Search
CPC ...... F16H 57/04; F16H 57/08; F16H 57/0471; F16H 57/043; F16H 1/28;
(Continued)

(56) References Cited

U.S. PATENT DOCUMENTS

2011/0092330 A1* 4/2011 Nishida .................. F03D 80/70
475/159
2011/0172048 A1 7/2011 Nishida et al.
(Continued)

FOREIGN PATENT DOCUMENTS

| DE | 102018216619 A1 | 9/2019 |
| EP | 3093514 A1 | 11/2016 |
| JP | 2000337360 A | 12/2000 |

OTHER PUBLICATIONS

Krieckmans, et al., Bearing Shell with Staggered Pockets for Oil Supply, Dec. 12, 2019, DE 102018209009 (Year: 2019).*
(Continued)

*Primary Examiner* — Sabbir Hasan
*Assistant Examiner* — Joshua R Beebe
(74) *Attorney, Agent, or Firm* — Timothy J. Klima; SHUTTLEWORTH & INGERSOLL PLC

(57) ABSTRACT

The invention relates to a planetary gear box, which has a sun gear, a plurality of planet gears, a ring gear, a plurality of plain bearing pins and an axially front carrier plate and an axially rear carrier plate. The plain bearing pin and the planet gear here configure a lubricated plain bearing which includes a plain bearing gap. Furthermore, the plain bearing pin, on the contact face thereof, configures a feed pocket which is provided and configured to receive oil and during the operation deliver oil in the circumferential direction to the plain bearing by way of a delivery edge. It is provided that the feed pocket is configured in the contact face of the plain bearing pin in such a manner that the delivery edge has a profile that deviates from a straight profile parallel to the longitudinal axis of the plain bearing pin.

18 Claims, 8 Drawing Sheets

(51) Int. Cl.
  *F16H 57/08* (2006.01)
  *F16H 1/28* (2006.01)
  *F16C 17/02* (2006.01)

(52) U.S. Cl.
  CPC ............ *F16H 1/28* (2013.01); *F16H 57/043* (2013.01); *F16H 57/08* (2013.01); *F05D 2220/323* (2013.01); *F16C 2361/65* (2013.01); *F16H 2057/085* (2013.01)

(58) Field of Classification Search
  CPC .... F16H 2057/085; F15C 33/10; F01D 15/12; F16C 7/02; F16C 2361/65; F05D 2220/323
  See application file for complete search history.

(56) References Cited

U.S. PATENT DOCUMENTS

| | | | |
|---|---|---|---|
| 2012/0108380 A1* | 5/2012 | Dinter | ................... F03D 80/70 475/159 |
| 2016/0327148 A1 | 11/2016 | Dinter | |
| 2017/0356493 A1* | 12/2017 | Kruhoffer | ............... F16H 57/04 |
| 2019/0162294 A1 | 5/2019 | Nique et al. | |
| 2019/0203768 A1* | 7/2019 | Meyer | .................. F16H 57/043 |
| 2020/0025103 A1* | 1/2020 | Schwengler | ............. F02C 7/36 |
| 2021/0025477 A1 | 1/2021 | Goumas | |

OTHER PUBLICATIONS

German Search Report dated Apr. 5, 2022 from counterpart German Patent Application No. 10 2021 122 300.8.

* cited by examiner

PLANETARY GEAR BOX

This application claims priority to German Patent Application DE102021122300.8 filed Aug. 27, 2021, the entirety of which is incorporated by reference herein.

The invention concerns a planetary gear box according to the present disclosure and to a gas turbine engine having a planetary gear box of this kind.

There is a known practice of coupling the fan of a gear fan engine to a turbine shaft via a planetary gear box, wherein the planetary gear box receives an input from the turbine shaft and outputs drive for the fan so as to drive the fan at a lower rotational speed than the turbine shaft. The planetary gear box comprises planet gears, which are driven by a sun gear and which revolve in a ring gear. Plain bearing pins are arranged in the planet gears, each pin forming a plain bearing with a respective planet gear and being connected to a planet carrier. The planet carrier is coupled to a drive for the fan. Such a planetary gear box is known from U.S. 2019/162294 A1, for example.

It is furthermore known to form a feed pocket on the outside of the plain bearing pins of a planetary gear box, wherein said feed pocket is filled via oil feeds with oil which lubricates the plain bearing between the plain bearing pin and the planet gear. In the event of an uneven deformation of the plan bearing pin of a planetary gear box during operation, the issue that the distribution of the lubricating oil in the plan bearing gap is uneven, wherein certain regions of the plain bearing are insufficiently supplied with oil, may arise.

The invention is based on the object of providing a planetary gear box in which the plain bearing gap between the planet gear and the plain bearing pin is sufficiently supplied with oil even in the event of a deformation of the plain bearing pin.

This object is achieved by means of a planetary gear box a plain bearing, and a gas turbine engine having features as disclosed herein. Design embodiments of the invention are set forth in the present disclosure.

Accordingly, in a first aspect of the invention, the present invention concerns a planetary gear box which comprises a sun gear, a plurality of planet gears, a ring gear, an axially front carrier plate, an axially rear carrier plate and a plurality of plain bearing pins. The sun gear rotates about a rotation axis of the planetary gear box, wherein the plurality of planet gears are driven by the sun gear and engage with the ring gear. The planet gears here each have a rotation axis. The plain bearing pins each have a longitudinal axis and an external contact face. The plain bearing pins at the axial ends thereof are connected to the axially front carrier plate and the axially rear carrier plate. A plain bearing pin is arranged in each planet gear, wherein the plain bearing pin and the planet gear form a lubricated plain bearing which comprises a plain bearing gap. The plain bearing pin, on the contact face thereof, configures a feed pocket which is provided and configured to receive oil and during the operation deliver the latter in the circumferential direction to the plain bearing by way of a delivery edge.

It is provided that the feed pocket is configured in the contact face of the plain bearing pin in such a manner that the delivery edge has a profile that deviates from a straight profile parallel to the longitudinal axis of the plain bearing pin.

Accordingly, the present invention is based on the concept of counteracting an uneven distribution of oil in the plain bearing gap in that oil, as a result of a profile of the delivery edge that deviates from an axial profile, is guided in a targeted manner into specific regions of the plain bearing gap.

To this end, one design embodiment provides that the feed pocket is configured in the contact face of the plain bearing pin in such a manner that the delivery edge runs obliquely to the longitudinal axis of the plain bearing pin. It is provided in particular that the delivery edge runs obliquely to the longitudinal axis of the plain bearing pin in such a manner that said delivery edge in the presence of a relative torque, which in an observed operating state acts on the two carrier plates of the planet carrier, runs at least approximately parallel to the rotation axis of the planet gear.

This design embodiment takes into account the primary reason for an oblique position of the plain bearing pin, said reason being a dissimilar torque acting on the two carrier plates. The axially front carrier plate is impinged with a torque which is primarily determined by the torque arising at the output side, between the planet gear and the ring gear. The axially rear carrier plate is impinged with a torque which is primarily determined by the torque arising at the input side, between the sun gear and the planet gear. As a result, the planet carrier can be rotated, this having the effect of a relative torque between the axially front carrier plate and the axially rear carrier plate. This relative torque leads to a deformation, specifically the oblique position of the plain bearing pin. In an observed operating state, this deformation of the plain bearing pin is substantially static.

The solution according to the invention provides that the delivery edge is configured obliquely to the longitudinal axis of the plain bearing pin in such a manner that said delivery edge in the oblique position of the plain bearing pin, which is established in the observed operating state, again runs straight in the sense that said delivery edge runs parallel or approximately parallel to the rotation axis of the planet gear, and thus of the plain bearing. It is achieved as a result that, despite the oblique position of the plain bearing pin, oil by way of the delivery edge is delivered uniformly to all regions of the plain bearing gap.

The feed pocket has two longitudinal edges that are spaced apart in the longitudinal direction, wherein the delivery edge forms one of the two longitudinal edges. The other of the two longitudinal edges, for example when viewed from above onto the contact face of the plain bearing pin, runs parallel to the delivery edge so that, when viewed from above, this approximately results in a feed pocket of which the external edges are disposed in a manner corresponding to a parallelogram, wherein the frontal ends of the feed pocket run in the circumferential direction. This is however to be understood merely as an example. The other one of the external edges can also be configured in a different manner, for example it can run parallel to the longitudinal axis of the plain bearing pin.

One further design embodiment provides that the two longitudinal edges of the feed pocket, when viewed from above onto the contact face, are bent outwards so that the feed pocket on the longitudinal edges thereof is convex, or curved outwards, respectively. A convex curvature of the feed pocket enables an increased uptake of oil by the feed pocket in the axially central region of the feed pocket, and accordingly also an increased delivery of oil in this region.

One further design embodiment of the invention provides that the feed pocket is configured in the contact face of the plain bearing pin in such a manner that the delivery edge configures at least one outflow spout that projects in the circumferential direction. This aspect of the invention is based on the concept of increasing the supply and delivery of oil in specific axial regions of the plain bearing gap by way of one or a plurality of outflow spouts that project in the circumferential direction. The outflow spouts here thus provide an increased delivery of oil because said outflow spouts extend the furthest in the circumferential direction. It can be provided here that the feed pocket at the axial position where the outflow spout is configured has an absolute or local maximum of the width, wherein the width of the feed pocket in the circumferential direction is understood to be the width, so that a particularly large amount of oil can be delivered into the plain bearing gap at the observed axial position.

The outflow spout here can be configured in such a manner that said outflow spout tapers to a point, for example. This is however to be understood merely as an example. For example, other design embodiments can provide a circumferential spout that is radiused on the projecting end thereof.

As a result of the outflow spouts, an increased quantity of oil for lubrication can thus be provided in a targeted manner in regions of the plain bearing gap in which, by virtue of the deformation of the plain bearing pin, there is a deficiency in the supply of oil.

To this end, one design embodiment provides that the delivery edge configures exactly one outflow spout. The outflow spout here is configured, for example, on one of the axial ends of the feed pocket, or in the axial center of the feed pocket.

To this end, one further design embodiment provides that the delivery edge configures a plurality of outflow spouts, wherein the delivery edge configures, for example, two outflow spouts which are configured on both axial ends of the feed pocket.

In this design embodiment it is also provided that the feed pocket configures two longitudinal edges which are spaced apart in the circumferential direction, wherein the delivery edge forms one of the longitudinal edges. This applies to the feed pocket in general. It can be provided here that the other longitudinal edge runs parallel to the longitudinal axis of the plain bearing pin.

As far as the profile of the depth of the feed pocket is concerned, the feed pocket can assume a multiplicity of design embodiments. In this way, one design embodiment can provide that the depth of the feed pocket varies in the circumferential direction, wherein it can be provided in particular that on the longitudinal edges the transition to those regions of the contact face of the plain bearing pin in which the feed pocket is not configured runs continually and without edges.

One further design embodiment provides that the depth of the feed pocket along a centerline of the feed pocket is constant. The centerline of the feed pocket here is defined as half the spacing between the lateral edges of the feed pocket. When the lateral edges are embodied so as to be rectilinear, the centerline is also rectilinear. The depth of the feed pocket is maximal in the region of the centerline of the feed pocket, for example. However, alternative design embodiments can provide that the depth of the feed pocket varies along the centerline.

One further design embodiment provides that the feed pockets have frontal ends which are spaced apart in the axial direction and extend in the circumferential direction.

In a further aspect of the invention, the present invention concerns a plain bearing which comprises a first bearing element having a contact face and a longitudinal axis, and a second bearing element having a contact face. The two bearing elements are configured to rotate relative to one another and to configure a plain bearing gap between the contact faces thereof. The first bearing element, on the contact face thereof, configures a feed pocket which is provided and configured to receive oil and during the operation deliver the latter in the circumferential direction to the plain bearing by way of a delivery edge. It is provided that the feed pocket is configured in the contact face of the first bearing element in such a manner that the delivery edge has a profile that deviates from a straight profile parallel to the longitudinal axis of the first bearing element.

The advantages and embodiments explained in the context of the planetary gear box according to the invention also apply in an analogous manner to the plain bearing according to the invention. It can be provided in particular that the feed pocket is configured in the contact face of the first bearing element in such a manner that the delivery edge runs obliquely to the longitudinal axis of the first bearing element, and/or that the delivery edge configures at least one outflow spout that projects in the circumferential direction.

The invention also relates to a gas turbine engine for an aircraft, which has:
    an engine core comprising a turbine, a compressor, and a turbine shaft connecting the turbine to the compressor;
    a fan, which is positioned upstream of the engine core, wherein the fan comprises a plurality of fan blades and is driven by a fan shaft; and
    a planetary gear box according to the present disclosure, the input of which is connected to the turbine shaft and the output of which is connected to the fan shaft.

One design embodiment in this regard may provide that
    the turbine is a first turbine, the compressor is a first compressor, and the turbine shaft is a first turbine shaft;
    the engine core further comprises a second turbine, a second compressor, and a second turbine shaft which connects the second turbine to the second compressor; and
    the second turbine, the second compressor, and the second turbine shaft are disposed with a view to rotating at a higher rotational speed than the first turbine shaft.

It is pointed out that the present invention is described with reference to a cylindrical coordinate system which has the coordinates x, r, and φ. Here, x indicates the axial direction, r indicates the radial direction, and φ indicates the angle in the circumferential direction. The axial direction here is identical with the engine axis of the gas turbine engine in which the planetary gear box is contained, wherein the axial direction points from the engine input in the direction of the engine output. Proceeding from the x-axis, the radial direction points radially outward. Terms such as "in front of", "behind", "front", and "rear" refer to the axial direction, or the flow direction in the engine. Terms such as "outer" or "inner" refer to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Assemblies of the present disclosure may be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect the turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor and the second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by the core shaft (for example only by the first core shaft, and not the second core shaft, in the example above) that is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber may lie directly downstream of the second compressor (for example at the exit of the latter), when a second compressor is provided. By way of a further example, the flow at the exit of the compressor may be fed to the inlet of the second turbine, when a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of attack of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of magnitude of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios can commonly be referred to as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about a rotation axis. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core at cruise conditions. In the case of some arrangements, the bypass ratio may be more than (of the order of magnitude of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of a non-limiting example, the overall pressure ratio of a gas turbine engine as described and/or claimed herein at constant speed can be greater than (or of the order of magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine may be defined as the net thrust of the engine divided by the total mass flow through the engine. The specific thrust of an engine as described and/or claimed herein at cruise conditions may be less than (or of the order of magnitude of): 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of magnitude of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of magnitude of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil may be manufactured at least in part from a composite, for example a metal matrix composite and/or an organic matrix composite, such as carbon fiber. By way of a further example, at least a part of the fan blade and/or of the airfoil may be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any arbitrary suitable method may be used for production of such a blisk or bling. For example, at least some of the fan blades may be machined from a block and/or at least some of the fan blades may be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing, in which.

Figure 5:
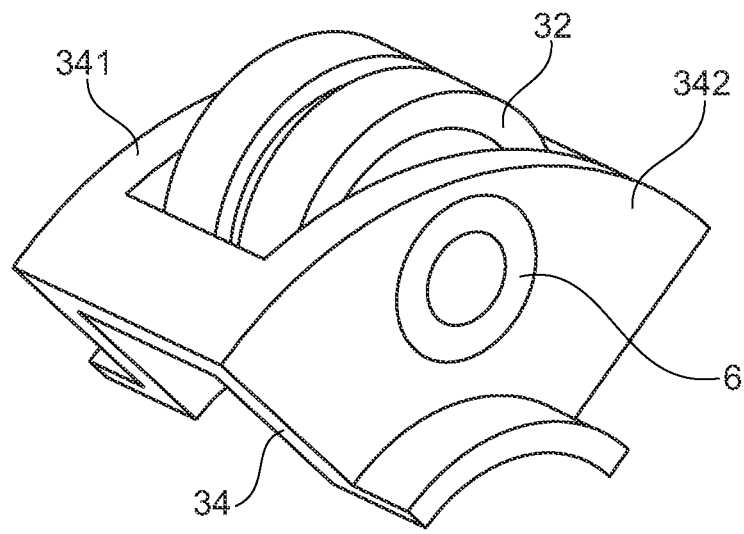
Figure 6:
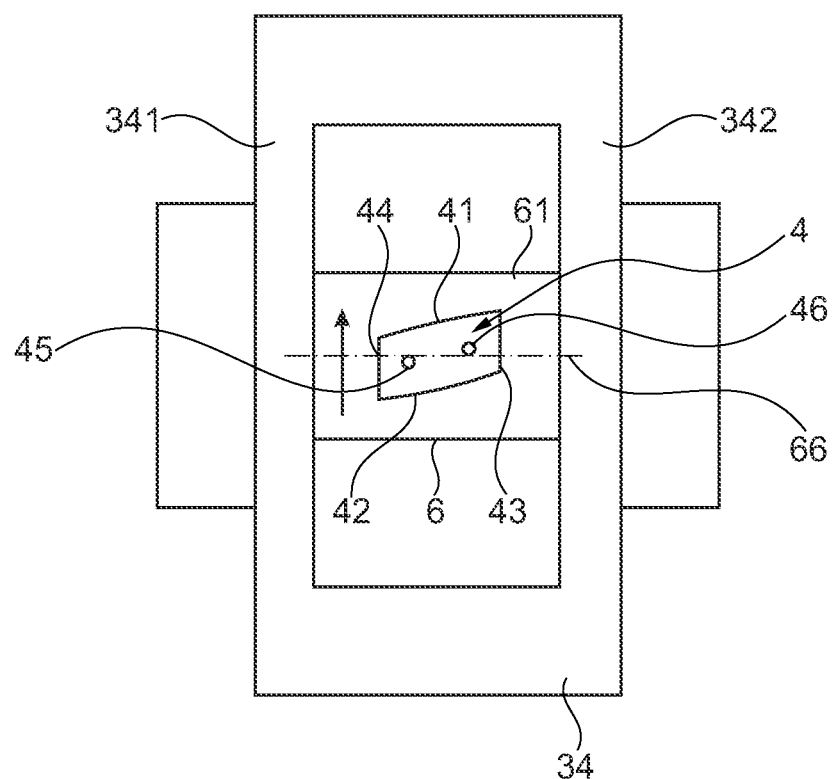
Figure 7:
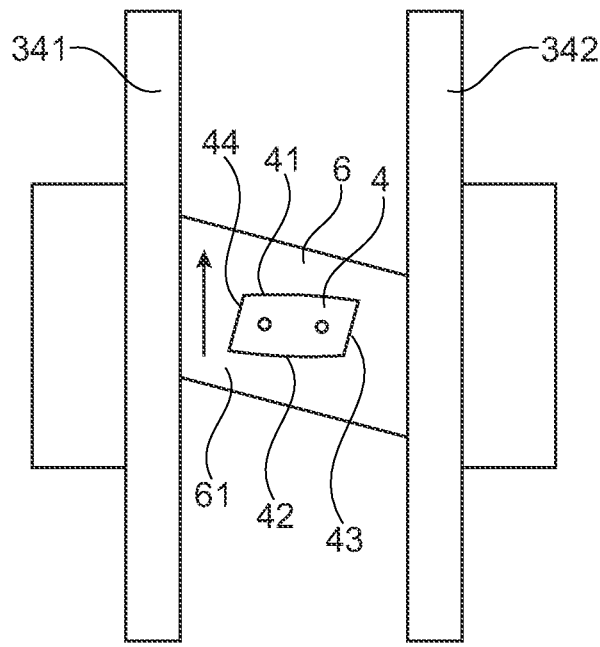
Figure 8:
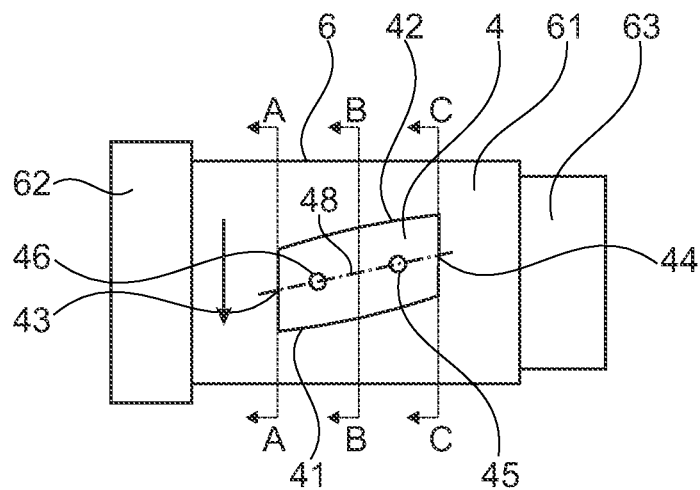
Figure 9:
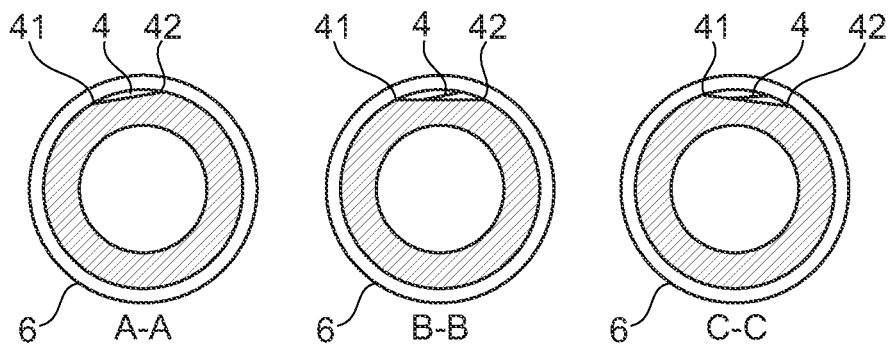
Figure 10:
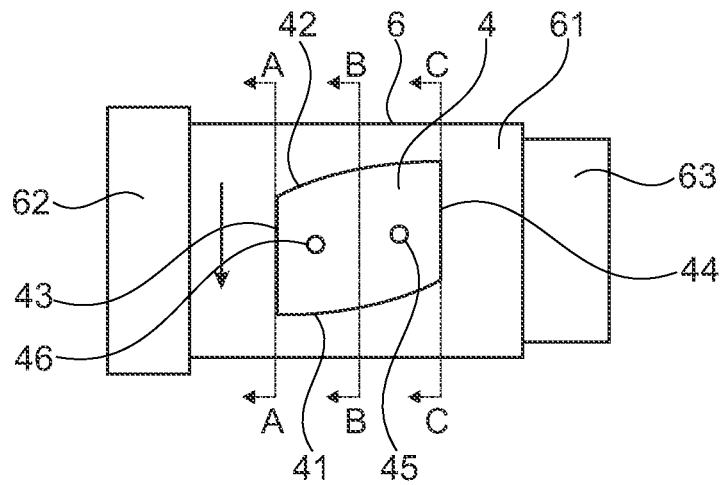
Figure 11:
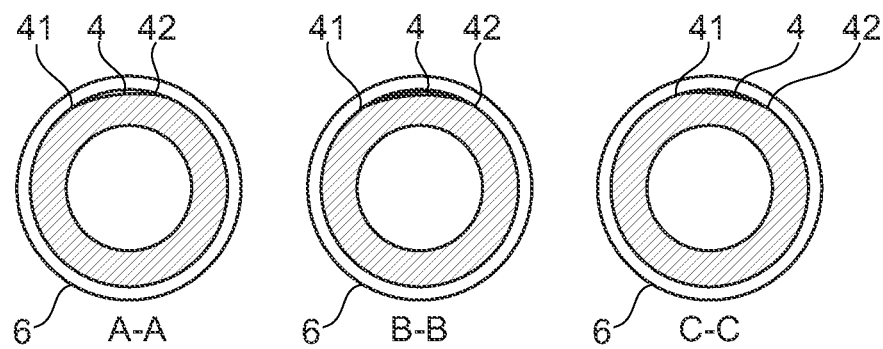
Figure 12:
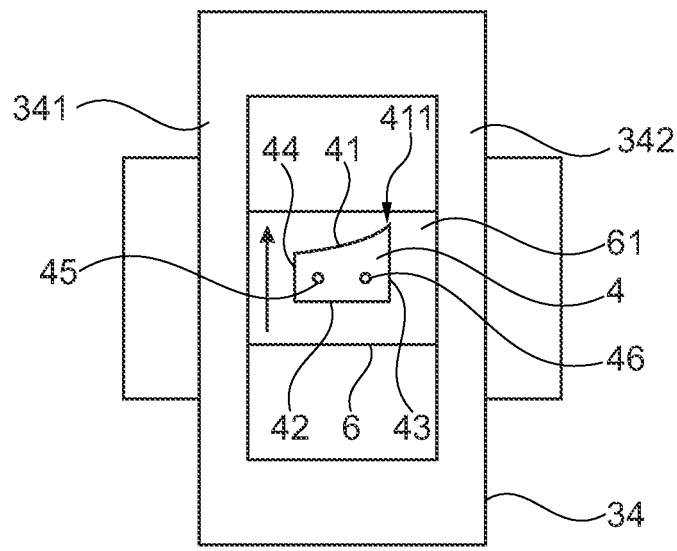
Figure 13:
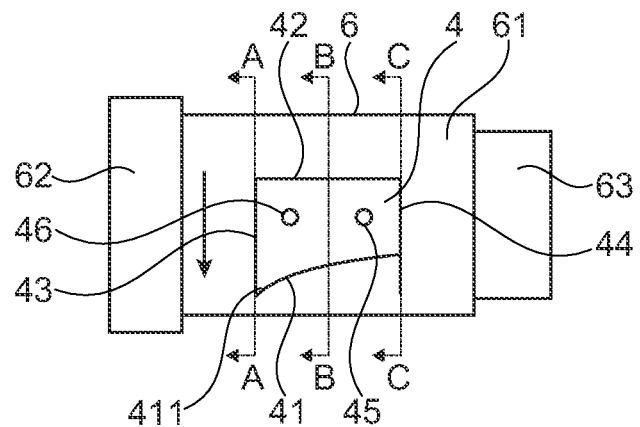
Figure 14:
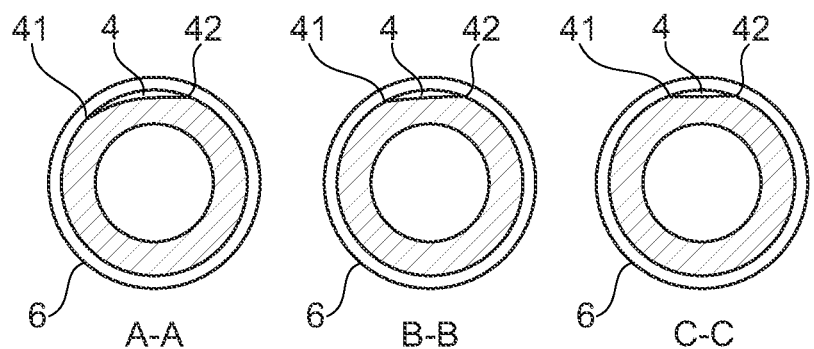
Figure 15:
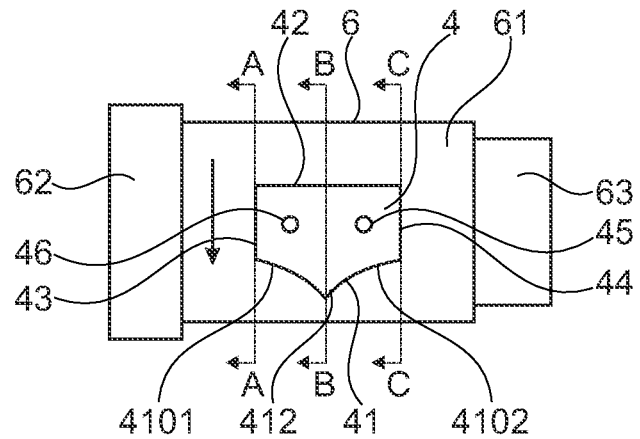
Figure 16:
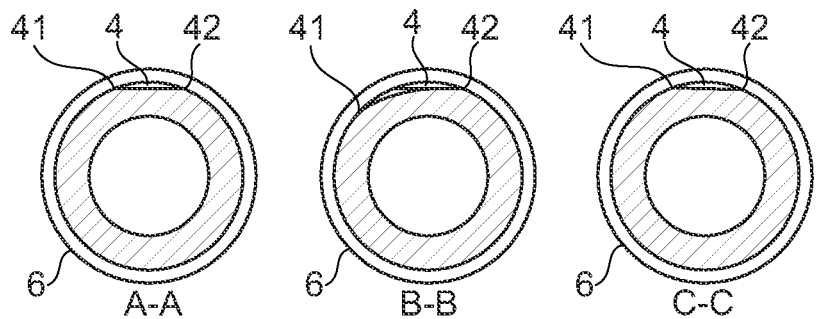
Figure 17:
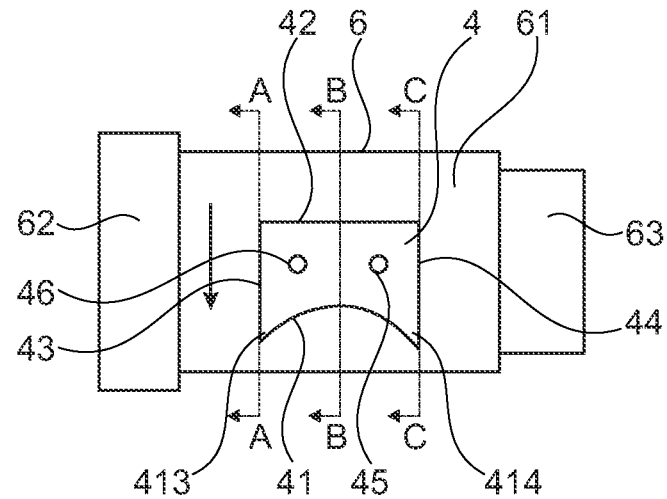
Figure 18:
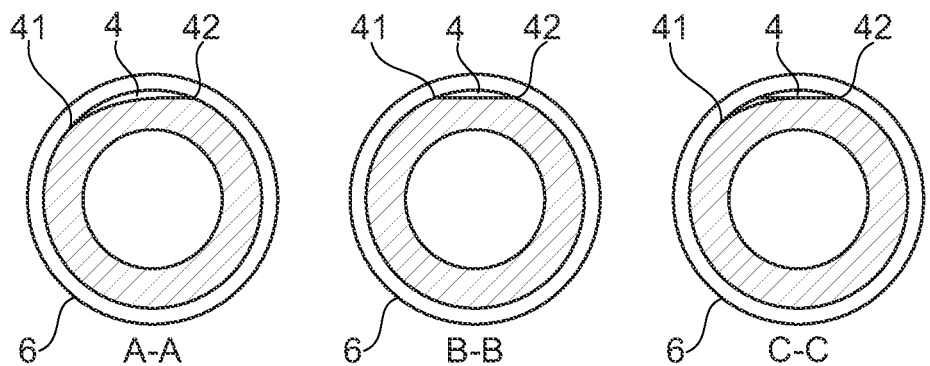

FIG. 5 in a perspective view shows a sub-portion of a planetary gear box, which represents a planet gear mounted on a plain bearing pin, wherein the plain bearing pin is connected to a planet carrier;

FIG. 6 shows a view from above onto the sub-portion of FIG. 5, wherein the planet gear is not illustrated and the plain bearing pin that is connected to the planet carrier can be seen, wherein the plain bearing pin has a feed pocket for lubricating oil, having an obliquely disposed delivery edge;

FIG. 7 shows an assembly according to FIG. 6 when a relative torque acts on the planet carrier and the planet gear is deformed, wherein the deformation leads to an alignment of the feed pocket that is straight in relation to the plain bearing;

FIG. 8 shows a plain bearing pin having a feed pocket having obliquely disposed longitudinal edges, according to FIGS. 6 and 7, in a view from above;

FIG. 9 shows three sectional views of the plain bearing pin of FIG. 8;

FIG. 10 shows a further design embodiment of a plain bearing pin having a feed pocket having obliquely disposed longitudinal edges, in a view from above;

FIG. 11 shows three sectional views of the plain bearing pin of FIG. 10;

FIG. 12 shows an assembly according to FIG. 6, wherein the plain bearing pin has a feed pocket for lubricating oil, having a delivery edge which at an axial end configures a projecting outflow spout;

FIG. 13 shows a plain bearing pin having a feed pocket having a projecting outflow spout, according to FIG. 12, in a view from above;

FIG. 14 shows three sectional views of the plain bearing pin of FIG. 13;

FIG. 15 shows a plain bearing pin having a feed pocket having a centrally projecting outflow spout, in a view from above;

FIG. 16 shows three sectional views of the plain bearing pin of FIG. 15;

FIG. 17 shows a plain bearing pin having a feed pocket having two outflow spouts at the axial ends of the feed pocket, in a view from above; and FIG. 18 shows three sectional views of the plain bearing pin of FIG. 17.

Figure 1:
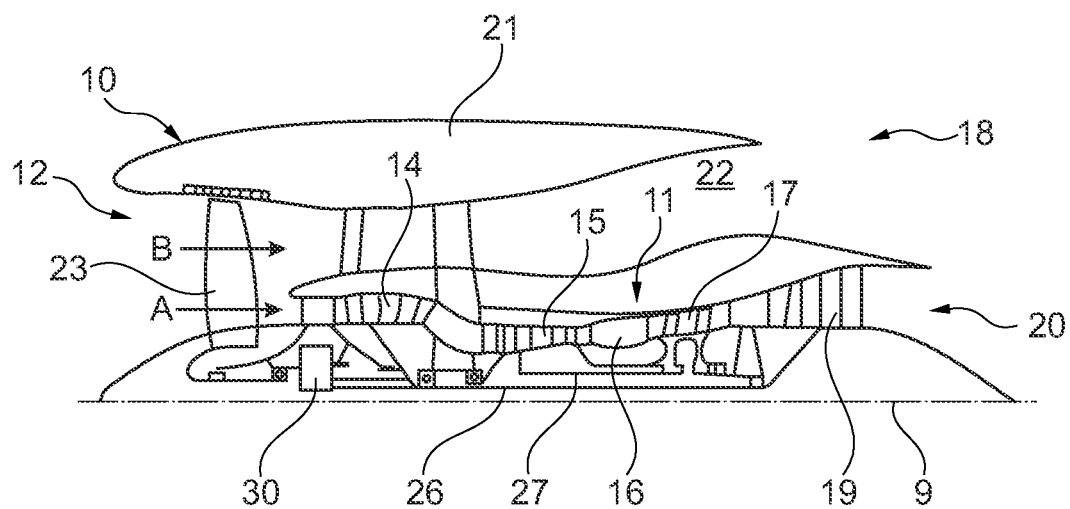
FIG. 1 shows a lateral sectional view of a gas turbine engine.

FIG. 1 illustrates a gas turbine engine 10 having a main rotation axis 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
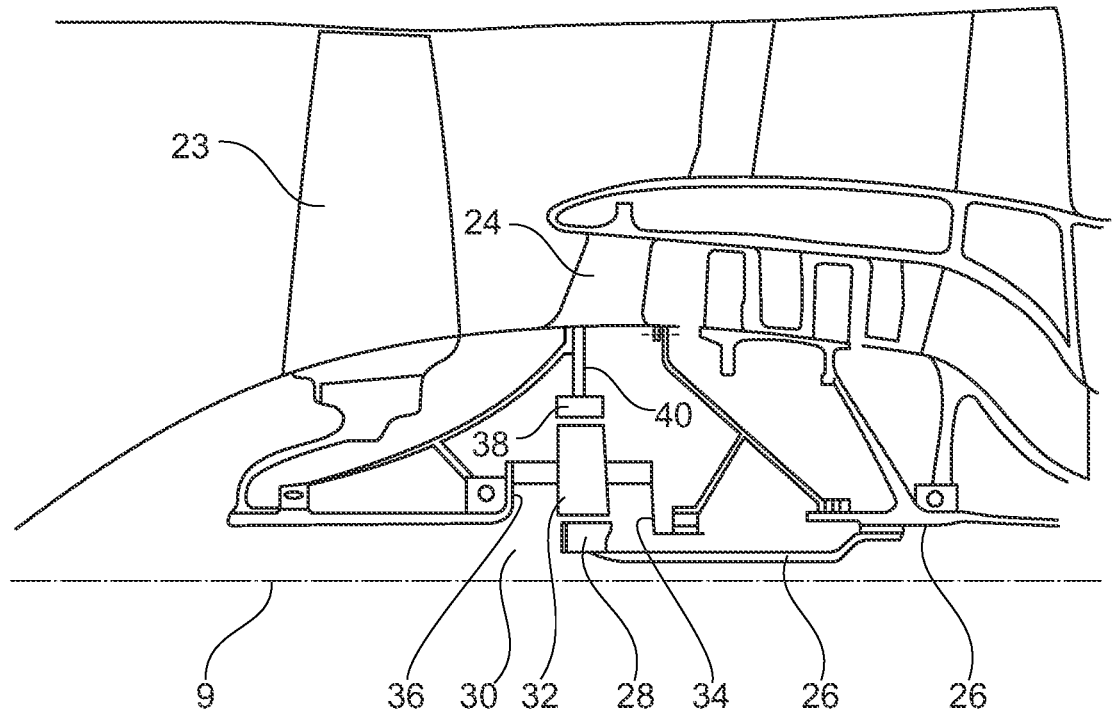
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26 which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting about the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not comprising the fan 23) respectively and/or the turbine and compressor stages that are connected to one another by the connecting shaft 26 with the lowest rotational speed in the engine (that is to say not comprising the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
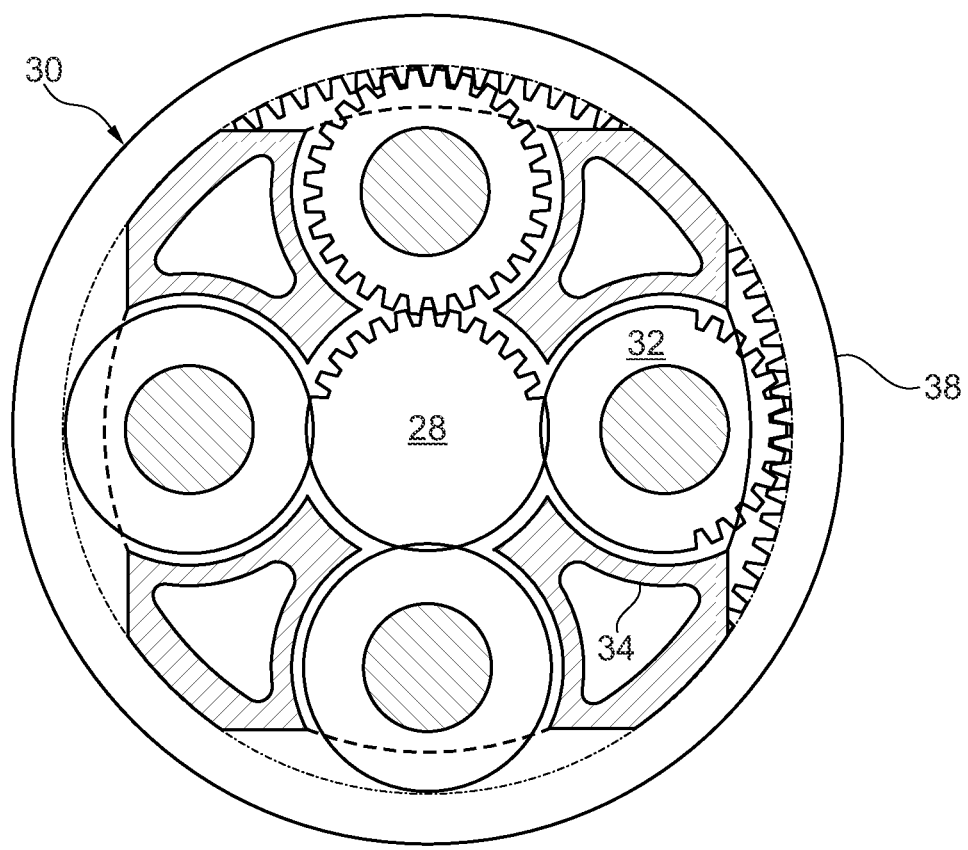
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in which the planet carrier 34 is coupled to an output shaft via linkages 36, wherein the ring gear 38 is fixedly established. However, any other suitable type of epicyclic gear box 30 can be used. By way of further example, the epicyclic gear box 30 can be a star arrangement, in which the planet carrier 34 is held so as to be fixedly established, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It is self-evident that the arrangement shown in FIGS. 2 and 3 is merely an example, and various alternatives fall within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixedly established structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive ancillary and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has its own nozzle, which is separate from the engine core nozzle 20 and is radially outside the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 potentially does not comprise a gear box 30.

The geometry of the gas turbine engine 10, and components thereof, is/are defined by a conventional axis system, which comprises an axial direction (which is aligned with the rotation axis 9), a radial direction (in the direction from bottom to top in FIG. 1), and a circumferential direction (perpendicular to the view in FIG. 1). The axial, radial and circumferential directions are mutually perpendicular.

Figure 4:
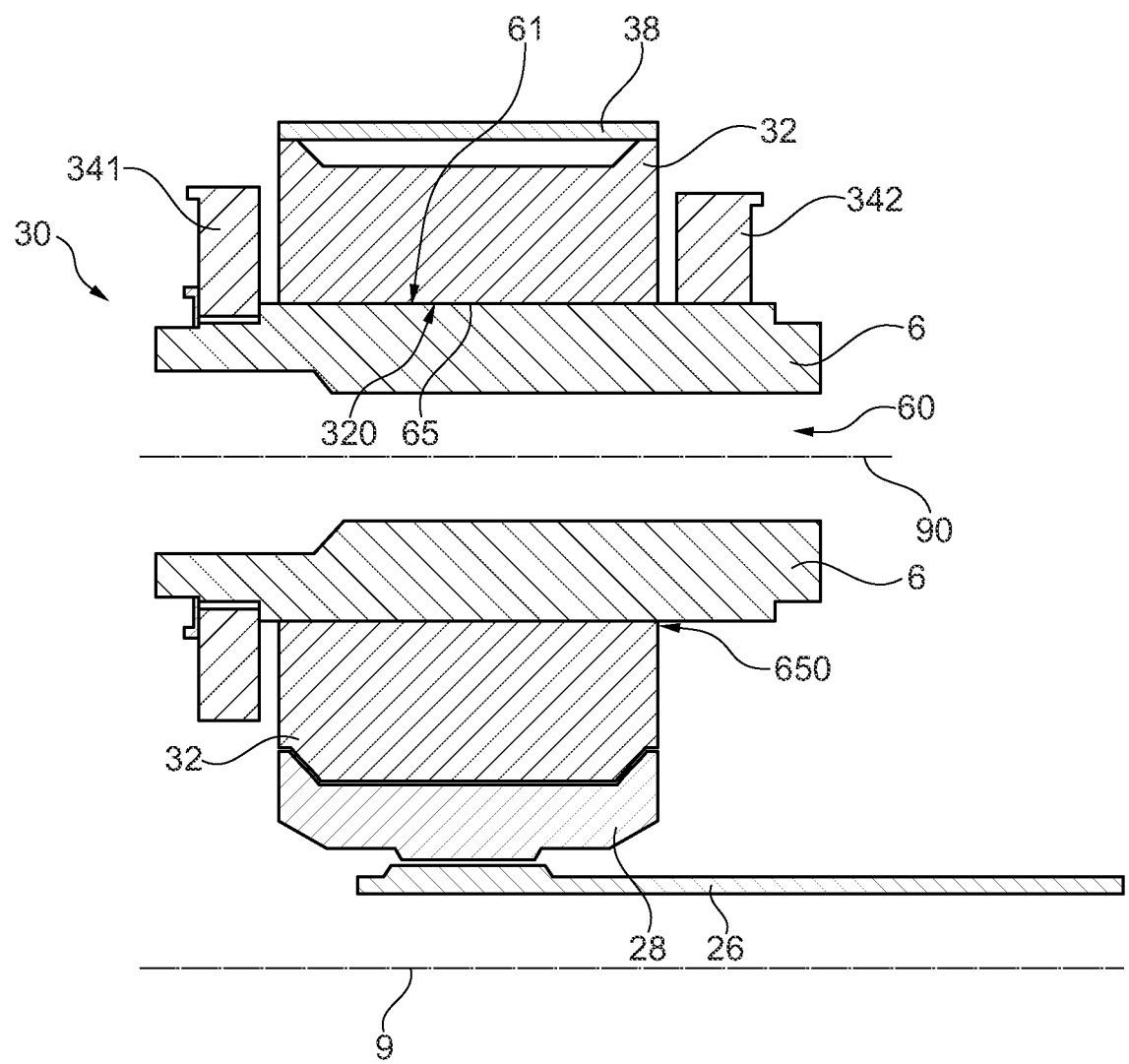
FIG. 4 shows a sectional illustration of elements of a planetary gear box which is suitable for use in a gas turbine engine according to FIG. 1.

For better understanding of the background of the invention, a planetary gear box known from the prior art is explained in more detail with reference to FIG. 4. FIG. 4 shows a sectional illustration of an exemplary embodiment of a planetary gear box 30 of a gas turbine engine configured as a geared fan engine as shown in FIG. 1. The planetary gear box 30 comprises a sun gear 28 which is driven by a drive shaft 26 or sun shaft. The drive shaft 26 is the shaft 26 in FIGS. 1 and 2 or, more generally, a turbine shaft. The sun gear 28 and the drive shaft 26 here rotate about the rotation axis 9. The rotation axis of the planetary gear box 30 is identical with the rotation axis 9 or engine axis of the gas turbine engine 10.

The planetary gear box 30 furthermore comprises a plurality of planet gears 32, one of which is illustrated in the sectional illustration in FIG. 4. The sun gear 28 drives the plurality of planet gears 32, wherein a toothing of the sun gear 28 is in engagement with a toothing of the planet gear 32.

The planet gear 32 is of hollow cylindrical design and forms an outer lateral surface and an inner lateral surface. Driven by the sun gear 28, the planet gear 32 rotates about a rotation axis 90, which is parallel to the rotation axis 9. The outer lateral surface of the planet gear 32 configures a toothing which is in engagement with the toothing of a ring gear 38. The ring gear 38 is arranged in a fixed manner, i.e. in such a way that it does not rotate. However, it is pointed out that the present invention is not restricted to planetary gear boxes with a stationary ring gear. It can likewise be implemented in planetary gear boxes with a stationary planet carrier and a rotating ring gear.

Owing to their coupling with the sun gear 28, the planet gears 32 rotate and, in so doing, move along the circumference of the ring gear 38. The rotation of the planet gears 32 along the circumference of the ring gear 38 and simultaneously about the rotation axis 90 is slower than the rotation of the drive shaft 26, thereby providing a reduction ratio.

Adjoining its inner lateral surface, the planet gear 32 has a centered axial opening. A plain bearing pin 6, which itself also has an axial bore 60, is incorporated in the opening, wherein the longitudinal axis of the bore is identical to the rotation axis 90 of the planet gear 32. The plain bearing pin 6 and the planet gear 32 form a plain bearing 65 at their mutually facing surfaces. The plain bearing pin 6 is also called a planet pin, planet gear pin or planet gear bearing pin.

The mutually facing surfaces of the plain bearing pin 6 and the planet gear 32 are an at least approximately cylindrical, external contact face or outer face 61 of the plain bearing pin 6 and an at least approximately cylindrical inner face 320 of the planet gear 32. These surfaces form the running surfaces of the plain bearing. Lubricating oil is present between the running surfaces 61, 320, and on rotation builds up a hydrodynamic lubricant film and separates the running surfaces from one another. Here the plain bearing forms a plain bearing gap 650 between the running surfaces 61, 320.

It is pointed out that the plain bearing pin 6 may have numerous designs. Its outer face 61 may be cylindrical or alternatively spherical, as described in U.S. 2019/162294 A1. The axial bore 60 of the plain bearing pin 6 may be hollow cylindrical or alternatively have an inner diameter which varies over the axial length, as also described in U.S. 2019/162294 A1. It is also conceivable that the plain bearing pin 6 for example has a stiffness which varies over its axial length, for example by means of different wall thicknesses, as described in US 2021/025477 A1. Moreover, the design of the plain bearing pin 6 with an axial bore 60 should be considered merely exemplary. It may alternatively be provided that the plain bearing pin 6 has no axial bore and is solid. Furthermore, embodiment variants may be provided in which the plain bearing pin is structured in the radial direction, for example comprises a main body and a plain bearing ring which is radially spaced from the main body, forming the plain bearing 65 together with the planet gear 32.

FIG. 4 furthermore shows a front carrier plate 341 and a rear carrier plate 342, which are constituent parts of the planet carrier 34, cf. FIG. 2. The planet gear pin 6 is fixedly connected to the front carrier plate 341 and to the rear carrier plate 342. The front carrier plate 341 is for example connected to a torque-transmitting member, which is coupled to a fan shaft.

To lubricate the bearing 65 between the plain bearing pin 6 and the planet gear 32, one or more oil supply systems are provided, which comprise oil feed channels (not shown) which each terminate in an oil feed pocket (not shown) formed on or machined into the outer contact face 61 of the plain bearing pin 6. Oil from a circulating oil system is conducted into the feed pockets in the plain bearing pin 6 via the oil feed channels. The oil is supplied for example via the axial inner bore 60 of the plain bearing pin 6.

It is pointed out that in a plain bearing 65 according to FIG. 4, the gap height of the plain bearing gap 650 between the plain bearing pin 6 and the planet gear 32 varies in the circumferential direction. This is related to the fact that, during operation of the planetary gear box, because of the rotating movement of the planet gears 32 and the interaction between the toothing of the planet gear 32 and the ring gear 38, the acting load reaches a maximum at a specific circumferential angle. In particular, the plain bearing gap 650 possesses a gap height which converges in the circumferential direction, reaches a minimum, and then diverges.

In a plain bearing according to FIG. 4, the issue may arise that, by virtue of dissimilar forces that act on the two carrier plates 341, 342, in particular when the two carrier plates 341, 342 are being mutually rotated, the plain bearing pin 6 is unevenly deformed and is misaligned in relation to the planet gear. This is accompanied by an uneven deformation of the plain bearing gap 650, which leads to an uneven distribution of the lubricating oil in the plain bearing gap 650. In the event of an uneven deformation of the plain bearing gap 650, it arises in particular that the feed pockets for the oil, which are configured on the contact face 61 of the plain bearing gap 650, downstream of the feed pocket deliver an uneven flow of oil, the latter taking place more intensely toward one axial end than toward the other axial end of the plain bearing, this potentially leading to localized insufficient lubrication. It can arise here that regions with smaller gap heights and/or with higher temperatures received less oil for lubricating and cooling than other regions. The overall result is a sub-optimal output of the plain bearing.

In the context of the present invention, the provision of ideally uniform distribution of the oil in the plain bearing gap is of importance. While the principles of the present invention have been described with reference to plain bearings in a planetary gear box of a gas turbine engine, said principles do also apply to plain bearings in any gear box.

FIG. 5 shows a perspective view of a fragment of a planetary gear box according to FIG. 4. To be seen here is a planet gear 32 which, while configuring a plain bearing, is mounted on a plain bearing pin 6. The plain bearing pin 6 on the two end sides thereof is mounted in an axially front carrier plate 341 and an axially rear carrier plate 342 of a planet carrier 34. Said plain bearing pin 6 possesses a longitudinal axis 66 which defines an axial direction of the plain bearing pin 6.

FIG. 6, in a view from above, shows the plain bearing pin 6 of FIG. 5 connected to the two carrier plates 341, 342, wherein the planet gear is not illustrated. In the resultant view from above onto the planet gear 6 it can be seen that the planet gear 6, on the side thereof that is directed radially outward in relation to the rotation axis 9 of the planetary gear box (see FIG. 4), in the contact face 61 thereof configures a feed pocket 4 which is configured for receiving oil of an oil supply system and to deliver said oil in the circumferential direction to the plain bearing. The rotation direction of the planet gear is indicated by the arrow plotted in the drawing. This also applies to the further figures.

The feed pocket 4 has two longitudinal edges 41, 42 and two frontal ends 43, 44. The two longitudinal edges 41, 42 herein are aligned obliquely to the longitudinal axis 66 of the plain bearing pin 6. In the view from above, this overall results in a parallelogram which forms the lateral limitations of the feed pocket 4. Two oil feed bores 45, 46 of an oil supply system, which is not illustrated, are configured centrically in the feed pocket 4, oil being directed into the feed pocket 4 by way of said oil feed bores 45, 46. It can also be provided here that the two oil feed bores are supplied with oil by two different oil supply systems, so as to provide a redundancy in the oil supply.

The one longitudinal edge 41 here forms the delivery edge of the feed pocket 4. This means that oil, which is situated in the feed pocket 4, in the event of a rotation of the planet gear in relation to the plain bearing pin 6 enters the plain bearing gap between the plain bearing pin 6 and the planet gear by way of the delivery edge 41. According to the oblique design embodiment of the longitudinal edges 41, 42 illustrated, the delivery edge 41 runs obliquely to the longitudinal axis 66 of the plain bearing pin 6.

The advantages associated with such an oblique arrangement of the delivery edge 41 and of the feed pocket 4 in the plain bearing pin 6 are derived from the illustration of FIG. 7. FIG. 7 shows the assembly according to FIG. 6 in a state in which a relative torque acts on the two carrier plates 341, 342 of the planet carrier 34. This is linked to the fact that the carrier plate 342 is imparted a torque primarily by way of the sun gear, and the carrier plate 341 is imparted a torque primarily by way of the planet gear, this leading to a torque differential, the latter being referred to as relative torque. The relative torque here leads to a deformation of the plain bearing pin 6 to the effect that the longitudinal axis thereof no longer runs parallel to the longitudinal axis of the planet gear 32, the plain bearing pin 6 however being deformed or tilted, respectively.

The relative torque here is constant for an observed operating state of the planetary gear box so that the deformation of the plain bearing pin 6 illustrated in FIG. 7 is substantially constant during the observed operating state. The configuration of the delivery edge 41 so as to be oblique to the longitudinal axis of the plain bearing pin 6 now leads to the delivery edge 41, in the presence of a relative torque acting on the two carrier plates 341, 342, henceforth running at least approximately parallel to the rotation axis 90 of the planet gear 32 (see FIG. 4). Despite the plain bearing pin 6 being deformed, it is achieved as a result that oil is uniformly delivered into the plain bearing gap by way of the delivery edge 41. In a rectilinear arrangement of the delivery edge 41, the delivery edge 41 in the deformed state illustrated in FIG. 7 and in the state of the plain bearing pin 6 not being impinged by forces would run obliquely to the rotation axis 90 of the planet gear 32 and thus deliver oil into the plain bearing gap more intensely in the direction of either of the two axial ends of the contact face 61, or of the plain bearing, respectively.

FIG. 8 shows the plain bearing pin 6 of FIGS. 6 and 7 in an enlarged illustration from above, wherein the illustration is rotated by 180° in comparison to the illustration of FIGS. 6 and 7. Additionally illustrated are two axial ends 62, 63 of the plain bearing pin 6, which in the assembled state are disposed in the carrier plates 341, 342. Furthermore schematically illustrated is an imaginary centerline 48 of the feed pocket 4, which is formed by the equidistant points between the two lateral edges 41, 42. The two oil feed bores 45, 46 are disposed on the centerline 48.

The feed pocket 4 along the centerline 48 thereof has a constant depth. This is derived from the sectional illustrations of FIG. 9, which have been performed along the lines A-A, B-B and C-C of FIG. 8. The position of the lateral edges 41, 42 here, as a function of the axial position, wanders in the circumferential direction. However, the maximum depth of the feed pocket 4 along the centerline 48 is constant. The depth of the feed pocket 4 decreases toward the lateral edges 41, 42.

FIGS. 10 and 11 in a view from above, or in sectional illustrations, respectively, show a plain bearing pin 6 which differs from the plain bearing pin of FIGS. 8 and 9 in that, on the one hand, the lateral edges 41, 42 are configured so as not to be substantially rectilinear but curved outward, and the depth of the lateral pocket varies along the centerline 48, on the other hand. The outward-curved lateral edges 41, 42 here lead to a bulging, convex shape of the feed pocket 4 to the effect that the latter in the center between the frontal ends 43, 44 has the largest extent in the circumferential direction so that the feed pocket 4 in this region can receive and deliver more oil.

The effect of a straight alignment of the delivery edge 41 while the planet carrier is stressed by torque, as explained in the context of FIG. 7, here is the same as in the plain bearing pin of FIGS. 6 to 9.

It can be seen in the sectional illustrations of FIG. 11 that the largest extent of the feed pocket 4 in the circumferential direction is in the centric section along the line B-B of FIG. 10. This manifests itself in a larger spacing between the lateral edges 41, 42. The largest depth of the feed pocket 4 is also in the axial center of the feed pocket 4. It can be achieved by such shaping that more oil is delivered into the plain bearing gap in the axially central region of the feed pocket 4 than at the lateral ends.

FIG. 12 shows an assembly corresponding to that of FIG. 6, wherein a plain bearing pin 6 is fastened between two carrier plates 341, 342 of a planet carrier 34. The planet gear which rotates about the plain bearing pin 6 is again not illustrated.

In a manner analogous to that as explained in the context of FIG. 6, the plain bearing pin 6 on the radially outward-directed contact face 61 thereof has a feed pocket 4 which is provided for receiving oil of an oil supply system and delivering said oil in the circumferential direction to the plain bearing. To this end, the contact face 61 has two longitudinal edges 41, 42 and two frontal ends 43, 44. One of the lateral edges 41 here forms the delivery edge for the delivery of oil into the plain bearing gap.

The feed pocket 4 is shaped in such a manner that the width of the feed pocket 4 in the circumferential direction varies as a function of the axial position, and herein occupies a maximum at the one frontal end 43. The delivery edge 41 at this maximum here configures a projecting outflow spout 411. This is however to be understood merely as an example. In other variants of embodiments, an outflow spout 411 that projects in the circumferential direction can be configured without the feed pocket 4 having a maximum at the axial position of the outflow spout.

The delivery edge 41 is configured so as to be curved in order for the outflow spout 411 to be configured. It can be provided here that the curvature of the delivery edge 41 increases toward the outflow spout 411.

FIGS. 13 and 14 in a view from above and in sectional illustrations show the plain bearing pin 6 of FIG. 12, wherein the assembly of FIGS. 13 and 14 is rotated by 180° in comparison to the assembly of FIG. 12. Accordingly, the delivery edge 41 in FIG. 13 is the lower lateral edge.

It can be seen that the lateral edge 42, which does not form the delivery edge 41, runs rectilinearly and herein parallel to the longitudinal axis 66 of the plain bearing pin 6 (see FIG. 6). In conjunction with the curved profile of the delivery edge 41 this has the result that the width of the feed pocket 41 in the circumferential direction varies as a function of the axial position.

It can be seen in the sectional illustrations of FIG. 14 that the width in the circumferential direction between the lateral edges 41, 42 differs as a function of the axial position. The maximum depth of the feed pocket 4 is identical at each axial position and is achieved, for example, in the region of an imaginary straight line that runs through the two oil feed bores 45, 46.

FIGS. 15 and 16 show an exemplary embodiment of a plain bearing pin 6 which, like the plain bearing pin of FIGS. 12 to 14, configures an outflow spout 412. As opposed to the exemplary embodiment of FIGS. 12 to 14, the outflow spout 412 is formed in the axial center of the feed pocket 4, or delivery edge 41, respectively. For forming the outflow spout 412, the delivery edge 41, proceeding from the two axial ends 43, 44, in a sub-portion 4101, 4102, is in each case configured so as to be arched, wherein the two arcs meet at a point on the outflow spout 412 that projects in the circumferential direction.

The region of the plain bearing gap that is fed with an increased amount of oil is established by the axial position of the outflow spout.

It can be seen in the sectional illustrations of FIG. 16 that the largest width of the feed pocket 4 in the circumferential direction is in the region of the outflow spout 412. The maximum depth of the feed pocket 4, also in this exemplary embodiment, is identical at each axial position and is achieved, for example, in the region of an imaginary straight line that runs through the two oil feed bores 45, 46.

FIGS. 17 and 18 show an exemplary embodiment of a plain bearing pin 6 which configures two outflow spouts 413, 414. The two outflow spouts 413, 440 are configured on the two axial ends 43, 44 of the feed pocket 4. Accordingly, the delivery edge 41 has an arcuate profile, where the arc formed toward the axial ends 43, 44 increasingly extends in the circumferential direction. As a result of a plurality of outflow spouts being provided it is possible for oil to be more intensely delivered into the plain bearing gap in a plurality of regions.

It can be seen in the sectional illustrations of FIG. 18 that the largest width of the feed pocket 4 in the circumferential direction is at the axial ends 43, 44, the latter corresponding to the sections along the lines A-A and C-C, respectively. The maximum depth of the feed pocket 4 in this exemplary embodiment is identical at each axial position and is achieved, for example, in the region of an imaginary straight line that runs through the two oil feed bores 45, 46.

It is pointed out that the exemplary embodiments of FIGS. 5 to 11, on the one hand, can be combined with the exemplary embodiments of FIGS. 12 to 18, on the other hand, such that an oblique profile of the delivery edge can thus be combined with the configuration of outflow spouts on the delivery edge.

The invention is not restricted to the present exemplary embodiments which should be regarded as merely exemplary. It is in particular pointed out that any of the features described may be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. A planetary gear box, comprising:
a sun gear which is rotatable about a rotation axis of the planetary gear box;
a plurality of planet gears, which are driven by the sun gear, wherein the planet gears each have a rotation axis;
a ring gear with which the plurality of planet gears are in engagement;
a plurality of plain bearing pins which each have a longitudinal axis and an external contact face, wherein one of the plain bearing pins is disposed in each of the planet gears;
an axially front carrier plate and an axially rear carrier plate, wherein the plain bearing pins at axial ends thereof are connected to the axially front carrier plate and the axially rear carrier plate;
wherein each plain bearing pin and planet gear combination configure a lubricated plain bearing which comprises a plain bearing gap, and
wherein the plain bearing pin, on the contact face thereof, forms a feed pocket which is provided and configured to receive oil and during operation, deliver oil in a circumferential direction to the plain bearing by way of a delivery edge,
wherein the feed pocket is configured in the contact face of the plain bearing pin such that the delivery edge has a profile that deviates from a straight profile parallel to the longitudinal axis of the plain bearing pin;
wherein the feed pocket is configured in the contact face of the plain bearing pin such that the delivery edge runs obliquely to the longitudinal axis of the plain bearing pin;
wherein the delivery edge runs obliquely to the longitudinal axis of the plain bearing pin such that the delivery edge in the presence of a relative torque, which in an observed operating state acts on the two carrier plates, runs at least approximately parallel to the rotation axis of the planet gear.

2. The planetary gear box according to claim 1, wherein the feed pocket includes two longitudinal edges which are spaced apart in the circumferential direction, wherein the delivery edge forms one of the longitudinal edges.

3. The planetary gear box according to claim 2, wherein the two longitudinal edges of the feed pocket, in at view from above onto the contact face of the plain bearing pin, run so as to be mutually parallel.

4. The planetary gear box according to claim 2, wherein the two longitudinal edges of the feed pocket, in a view from above onto the contact face of the plain bearing pin, are bent outwards.

5. The planetary gear box according to claim 1, wherein the feed pocket is configured in the contact face of the plain bearing pin such that the delivery edge forms at least one outflow spout that projects in the circumferential direction.

6. The planetary gear box according to claim 5, wherein a width of the feed pocket in the circumferential direction varies as a function of an axial position and has at least one maximum at which the delivery edge configures the projecting outflow spout.

7. The planetary gear box according to claim 5, wherein the outflow spout tapers to a point.

8. The planetary gear box according to claim 5, wherein the delivery edge forms exactly one outflow spout.

9. The planetary gear box according to claim 8, wherein the outflow spout is configured on one of the axial ends.

10. The planetary gear box according to claim 8, wherein the outflow spout is configured in an axial center of the feed pocket.

11. The planetary gear box according to claim 7, wherein the delivery edge configures a plurality of outflow spouts.

12. The planetary gear box according to claim 11, wherein the delivery edge configures two outflow spouts which are configured on the two axial ends.

13. The planetary gear box according to claim 5, wherein the feed pocket configures two longitudinal edges that are spaced apart in the circumferential direction, wherein the delivery edge forms one of the longitudinal edges and the other longitudinal edge runs parallel to the longitudinal axis of the plain bearing pin.

14. The planetary gear box according to claim 1, wherein a depth of the feed pocket varies in the circumferential direction.

15. A gas turbine engine for an aircraft, comprising:
an engine core comprising a turbine, a compressor, and a turbine shaft connecting the turbine to the compressor;
a fan, which is positioned upstream of the engine core, wherein the fan comprises a plurality of fan blades and is driven by a fan shaft; and
the planetary gear box according to claim 1, the input of which is connected to the turbine shaft and the output of which is connected to the fan shaft.

16. A plain bearing, comprising:
a first bearing element which has a contact face and a longitudinal axis;
a second bearing element which has a contact face, wherein
the two bearing elements are configured to rotate relative to one another and between the contact faces thereof to form a plain bearing gap; and
the first bearing element, on the contact face thereof, includes a feed pocket which is configured to receive oil and during operation, deliver oil in a circumferential direction to the plain bearing by way of a delivery edge,
wherein the feed pocket is configured in the contact face of the first bearing element such that the delivery edge has a profile that deviates from a straight profile parallel to the longitudinal axis of the first bearing element;
wherein the feed pocket is configured in the contact face of the plain bearing pin such that the delivery edge runs obliquely to the longitudinal axis of the plain bearing pin;
wherein the delivery edge runs obliquely to the longitudinal axis of the plain bearing pin such that the delivery edge in the presence of a relative torque, which in an observed operating state acts on opposing support positions for the first bearing element, runs at least approximately parallel to a rotation axis of the second bearing element.

17. The plain bearing according to claim 16, wherein the feed pocket is configured in the contact face of the first bearing element such that the delivery edge runs obliquely to the longitudinal axis of the first bearing element.

18. The plain bearing according to claim 16, wherein the feed pocket is configured in the contact face of the first bearing element such that the delivery edge includes at least one outflow spout that projects in the circumferential direction.

\* \* \* \* \*